(12) United States Patent
Lai et al.

(10) Patent No.: US 8,080,986 B2
(45) Date of Patent: Dec. 20, 2011

(54) DRIVING CONTROL DEVICE AND METHOD FOR POWER CONVERTING SYSTEM

(75) Inventors: Yen-Shin Lai, Taipei (TW); Ye-Then Chang, Taipei (TW)

(73) Assignee: National Taipei University Technology, Taipei (TW)

( * ) Notice: Subject to any disclaimer, the term of this patent is extended or adjusted under 35 U.S.C. 154(b) by 170 days.

(21) Appl. No.: 12/547,563

(22) Filed: Aug. 26, 2009

(65) Prior Publication Data
US 2011/0050187 A1  Mar. 3, 2011

(51) Int. Cl.
*G05F 1/00* (2006.01)
(52) U.S. Cl. .......................... 323/285; 323/224; 323/283
(58) Field of Classification Search .................. 323/224, 323/283, 284, 285
See application file for complete search history.

(56) References Cited

U.S. PATENT DOCUMENTS

| | | | |
|---|---|---|---|
| 7,321,222 B2 * | 1/2008 | Hojo | 323/224 |
| 7,449,869 B2 * | 11/2008 | Markowski | 323/283 |
| 7,902,803 B2 * | 3/2011 | Peng et al. | 323/283 |
| 7,923,980 B2 * | 4/2011 | Takahashi et al. | 323/283 |
| 2008/0007241 A1 * | 1/2008 | Isham | 323/285 |
| 2008/0164859 A1 * | 7/2008 | Peng et al. | 323/318 |
| 2008/0252277 A1 * | 10/2008 | Sase et al. | 323/283 |
| 2009/0102446 A1 * | 4/2009 | Takahashi et al. | 323/283 |

* cited by examiner

*Primary Examiner* — Shawn Riley
(74) *Attorney, Agent, or Firm* — Chun-Ming Shih

(57) ABSTRACT

A driving control device and method for power converting system includes power converting circuit and driving control device. The driving control device has an analog/digital convertor, a measuring device, and a control module. The driving control method is the analog/digital convertor receives a inductor current and the parameters of the inductor current from the measuring device, measures the slope parameter of the inductor current according the parameters from Equation 1 and Equation 2, then calculates a duty cycle parameter from the slope parameter of the inductor current and use the duty cycle parameter to generate pulse control signal to perform driving control.

9 Claims, 8 Drawing Sheets

DRIVING CONTROL DEVICE AND METHOD FOR POWER CONVERTING SYSTEM

BACKGROUND OF THE INVENTION

1. Field of the Invention

This invention relates to a driving control device and method for power converting system specialized in automatically calculating the slope parameter for inductor current and providing this parameter to the power converting system for driving the control.

2. Description of the Prior Art

The conventional digital-controlled switching power converting circuit is better than the analog-controlled ones because the circuit aged slower, less power consumption, easier to modify the algorithms, and easier to design and accomplish. But the quick analog/digital convertor senses and feedbacks current and voltage to the digital controller, sampling frequency will affect the result. It needs to raise the sampling frequency to observe more data to solve this problem and minimize the error.

Raising the sampling frequency causes more converting time and as part of the feedback loop, it also causes extra phase lag. Besides the phase lag in analog control, the delay of converting process will result in extra waiting loop and slow down the instant reaction. High sampling frequency analog/digital convertor is also more expensive.

So as to avoid the delay of converting and save cost on components, it is necessary to lower sampling frequency. Under the condition of low sampling frequency, a practical way is to use inductance to calculate the slope parameter for inductor current of switching power converting circuit while controlling current, and use it to control the duty cycle of pulse signals.

As shown in FIG. 1 is an oscillogram of current used technology. With the known slope parameter for inductor current $m_1$ and $m_2$, the duty cycle of pulse signal can be determined by referring to the difference between the referring current $I_{ref}$ and sampling inductor current $i_{L,1}$, and the slope parameter for inductor current (use sampling period T[n] to sample inductor current $i_L$ and calculate the width of the pulse control signal D[n]·T[n]). Since the actual inductance is hard to obtained and measured, high-accuracy current control cannot be achieved because there is no accurate slope parameter for inductor current.

So as to know, the current known practice has lot of drawbacks, is not a good design, and must be improved.

Noticing the disadvantages of the current method mentioned the inventor of this invention dedicates to improvement and invention. After years of hard working, this invention of automatically measuring the inductor current slope parameter for driving control device and method for power converting system is successfully invented.

SUMMARY OF THE INVENTION

The primary objective for this invention is to provide a driving control device and method for power converting system to solve the problem of actual inductance that is hard to obtained and measured.

The second objective for this invention is to provide a driving control device and method for power converting system whose power converting system can detect the slope parameter of inductor current, to help high-accuracy digital controlled low sampling frequency in power converting system.

The driving control device and method for power converting system of the present invention that achieve the purposes mentioned above convert direct current (DC) input voltage $V_{in}$ to DC output voltage $V_o$. The power converting system contains a power converting circuit and a driving control device. The driving control device includes an analog/digital convertor, a measuring unit, and a control module. The analog/digital convertor converts the output voltage and inductor current into digital parameters. The measuring unit collects data of parameters of the inductor current, duty cycle of the switching unit, and sampling pulse signal. It uses Eq. 1, Eq. 2 (described below), and the data it collects to calculate the slope parameter of the inductor current. It also uses the duty cycle calculated from the slope parameter of inductor current to generate pulse control signal to operate the open or close of the switching device.

The technical theory used in this invention is automatically detecting the slope parameter of inductor current to help accomplishing high-accuracy digital control in power converting system with low sampling frequency.

DETAILED DESCRIPTION OF THE PREFERRED EMBODIMENT

Figure 1:
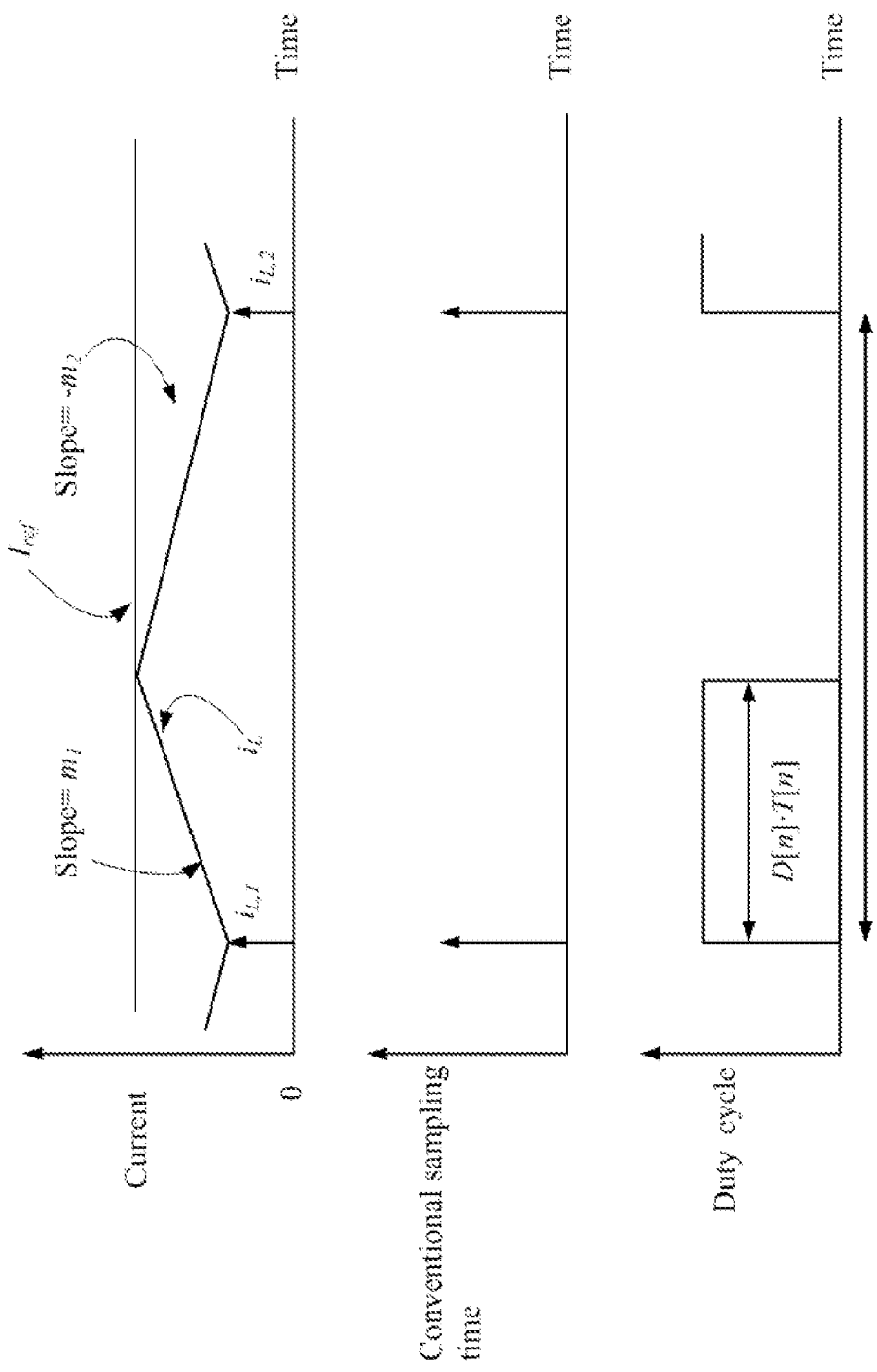
FIG. 1 shows the oscillogram of switching power converting circuit of conventional technology.
Figure 2:
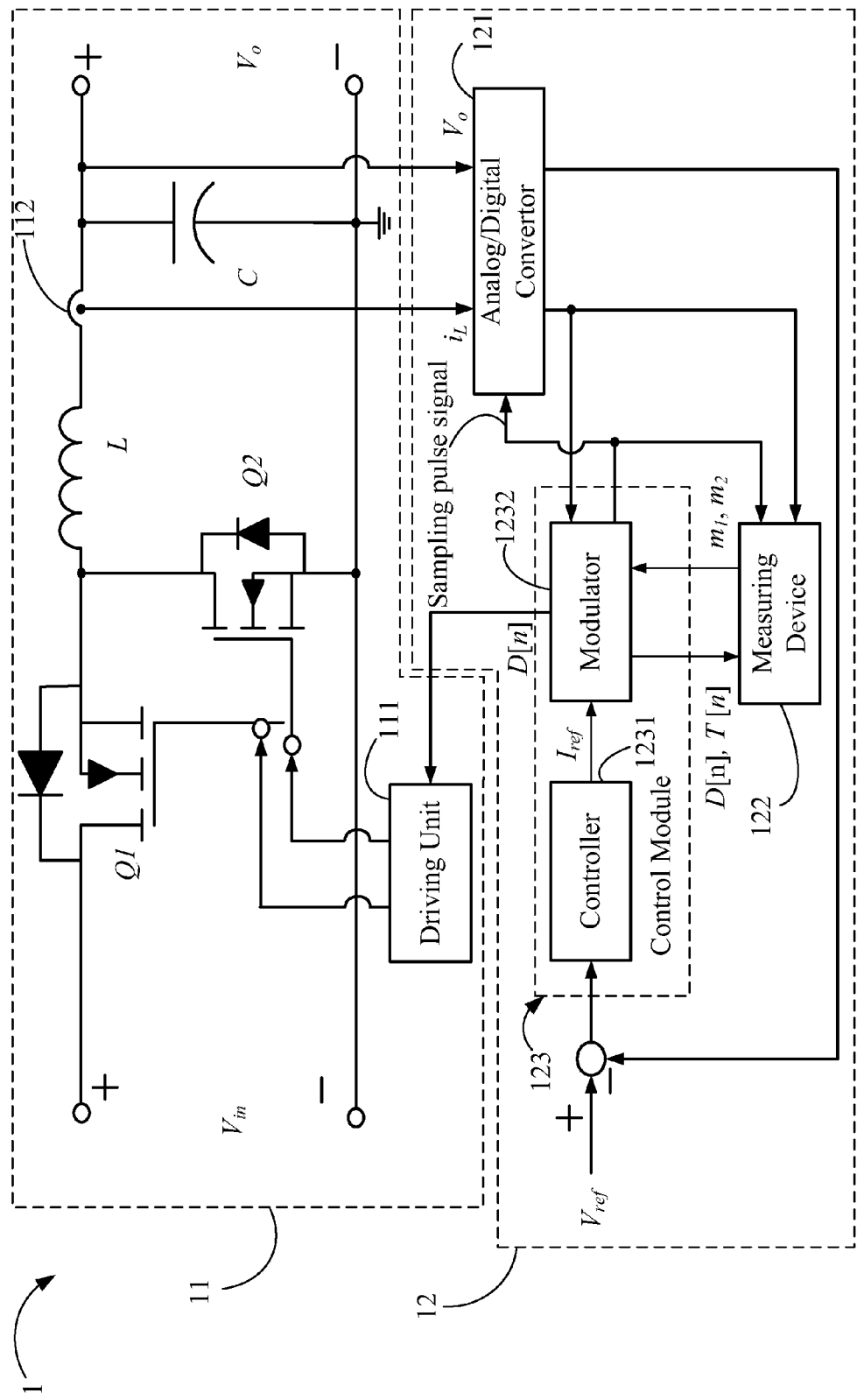
FIG. 2 shows the power converting system layout for this invention of driving control device and method for power converting system.
Figure 3:
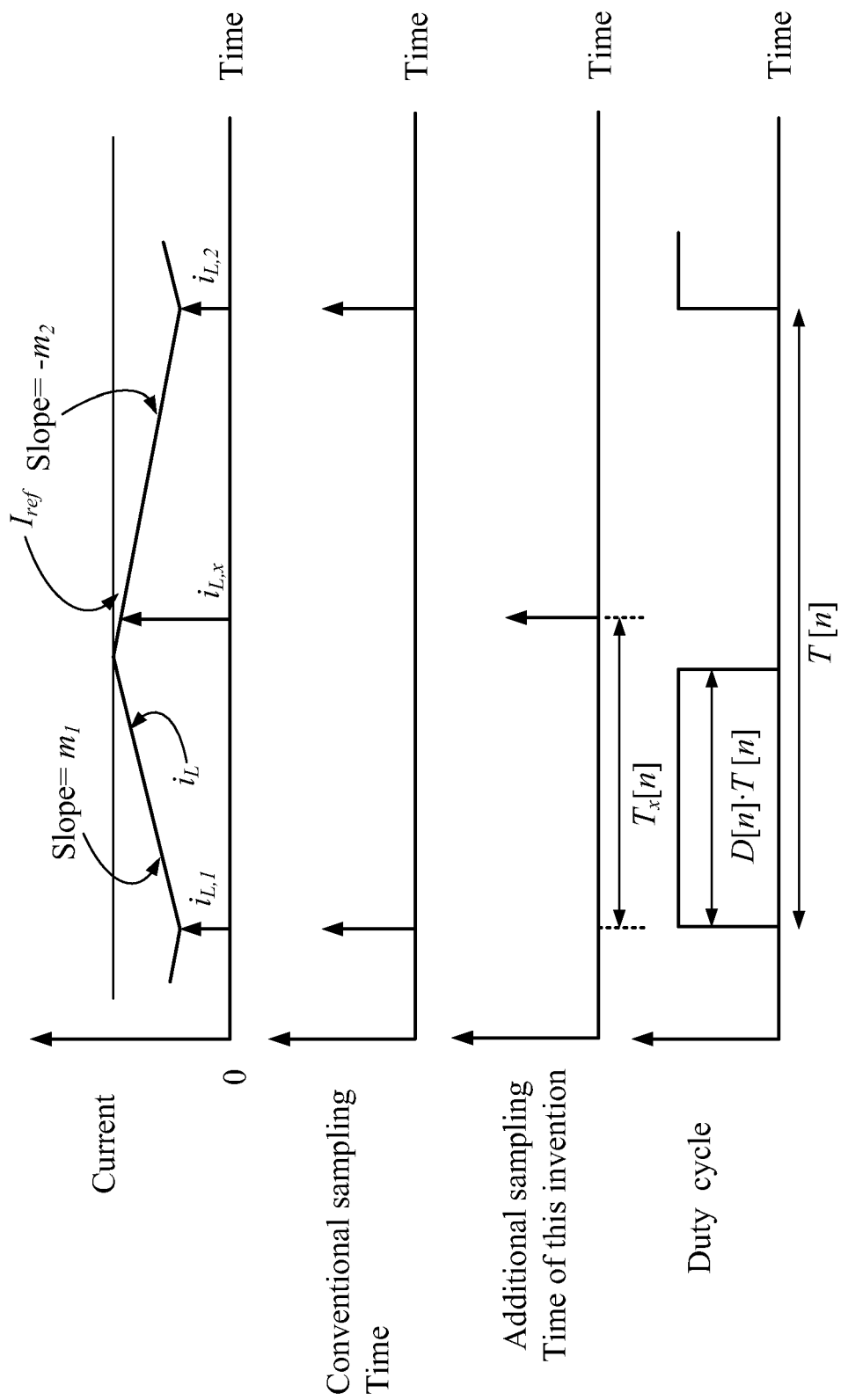
FIG. 3 shows the trailing edge modulation oscillogram of this invention of driving control device and method for power converting system.
Figure 4:
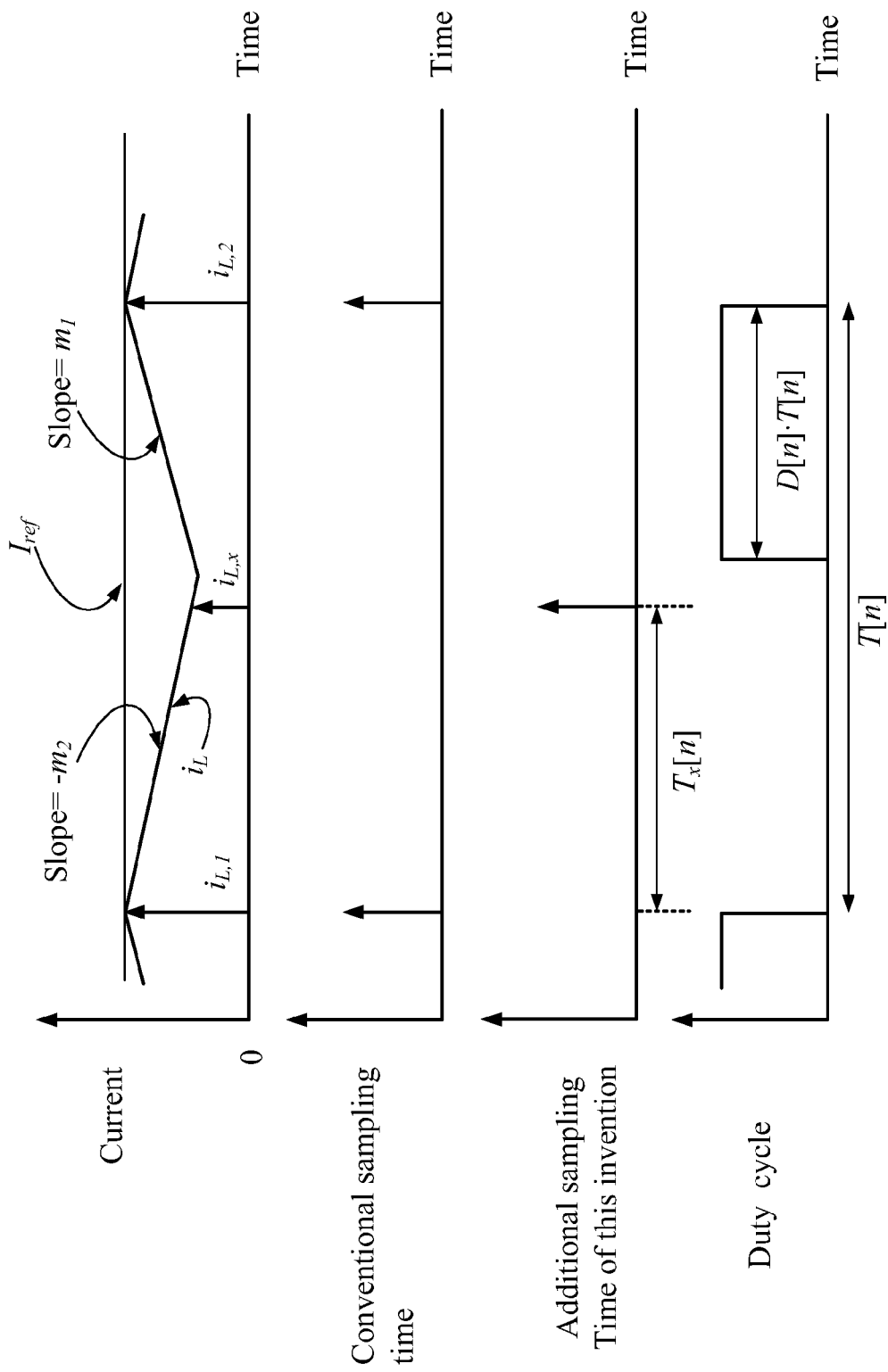
FIG. 4 shows the leading edge modulation oscillogram of this invention of driving control device and method for power converting system.
Figure 5:
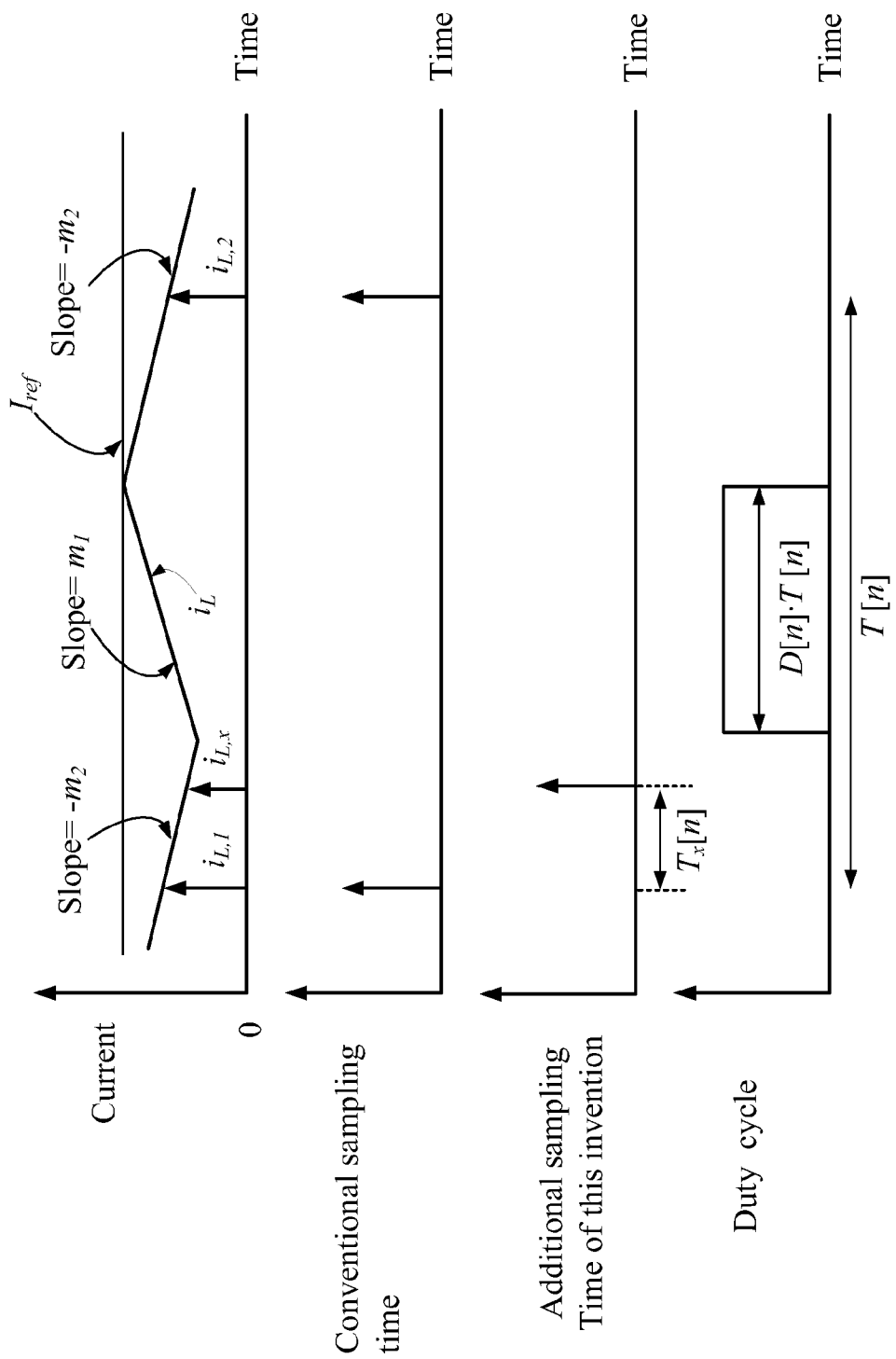
FIG. 5 shows the triangle modulation 1 oscillogram of this invention of driving control device and method for power converting system.
Figure 6:
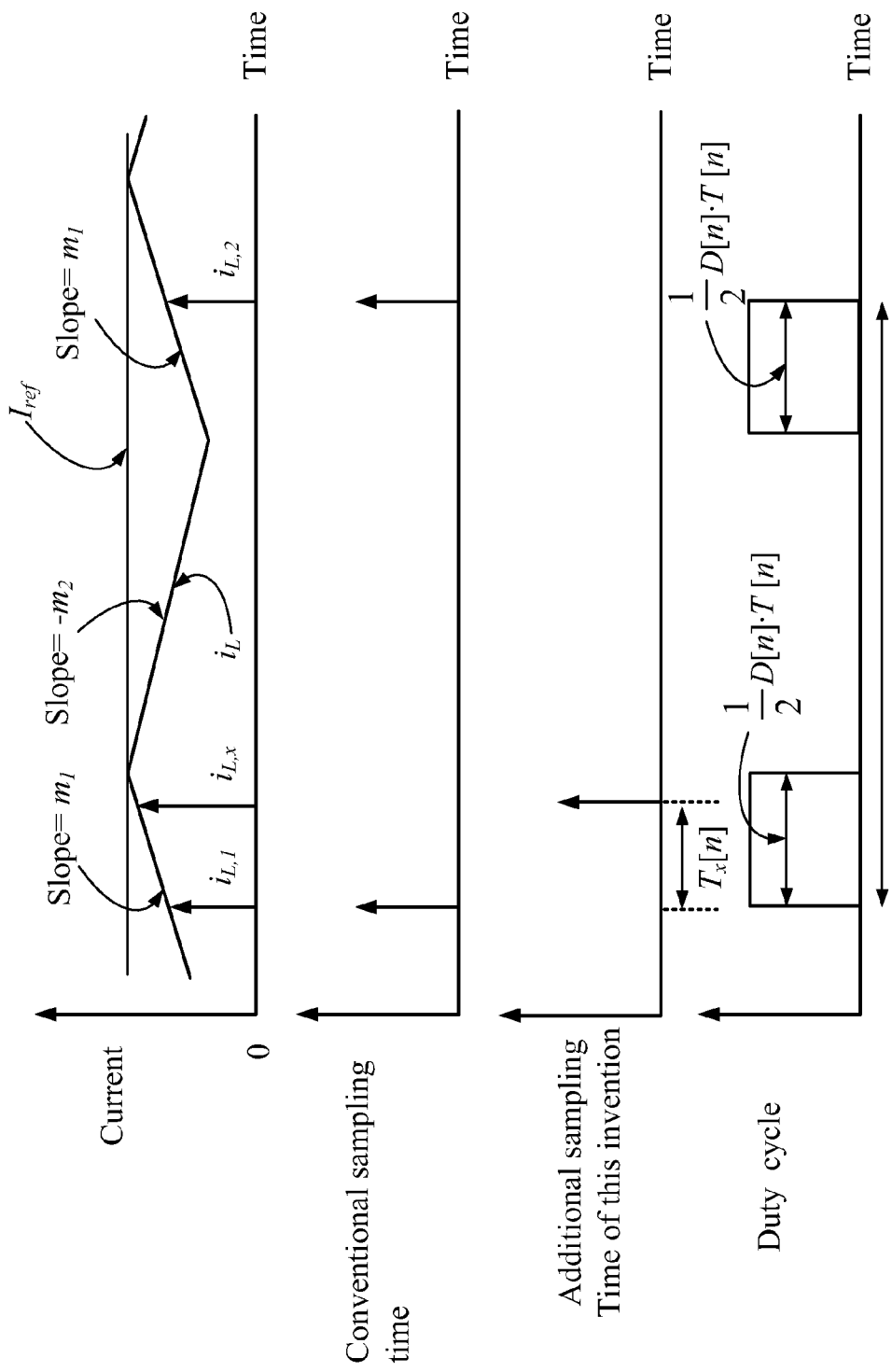
FIG. 6 shows the triangle modulation 2 oscillogram of this invention of driving control device and method for power converting system.
Figure 7:
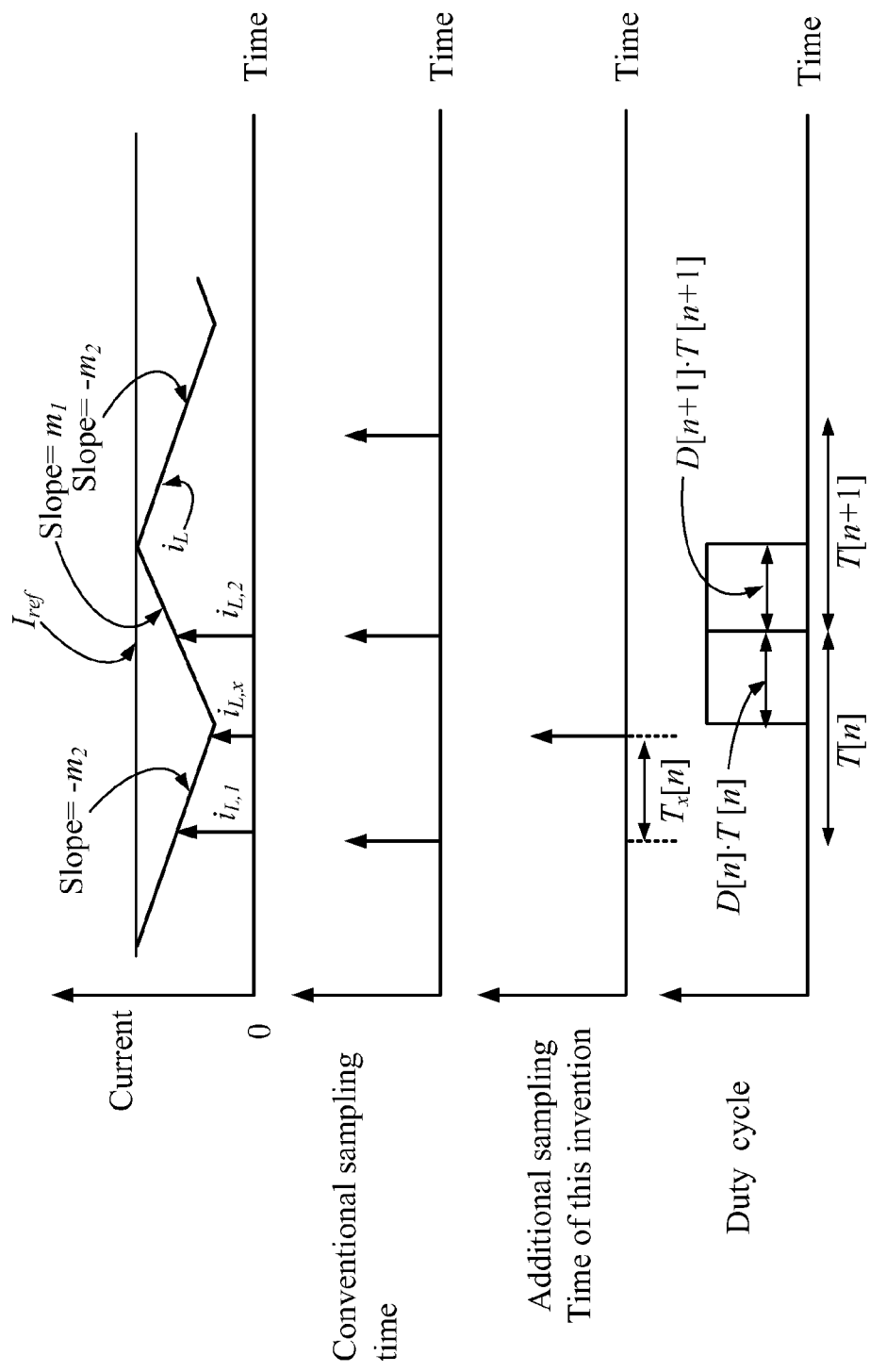
FIG. 7 shows the single switching period dual sampling modulation 1 oscillogram of this invention of driving control device and method for power converting system.
Figure 8:
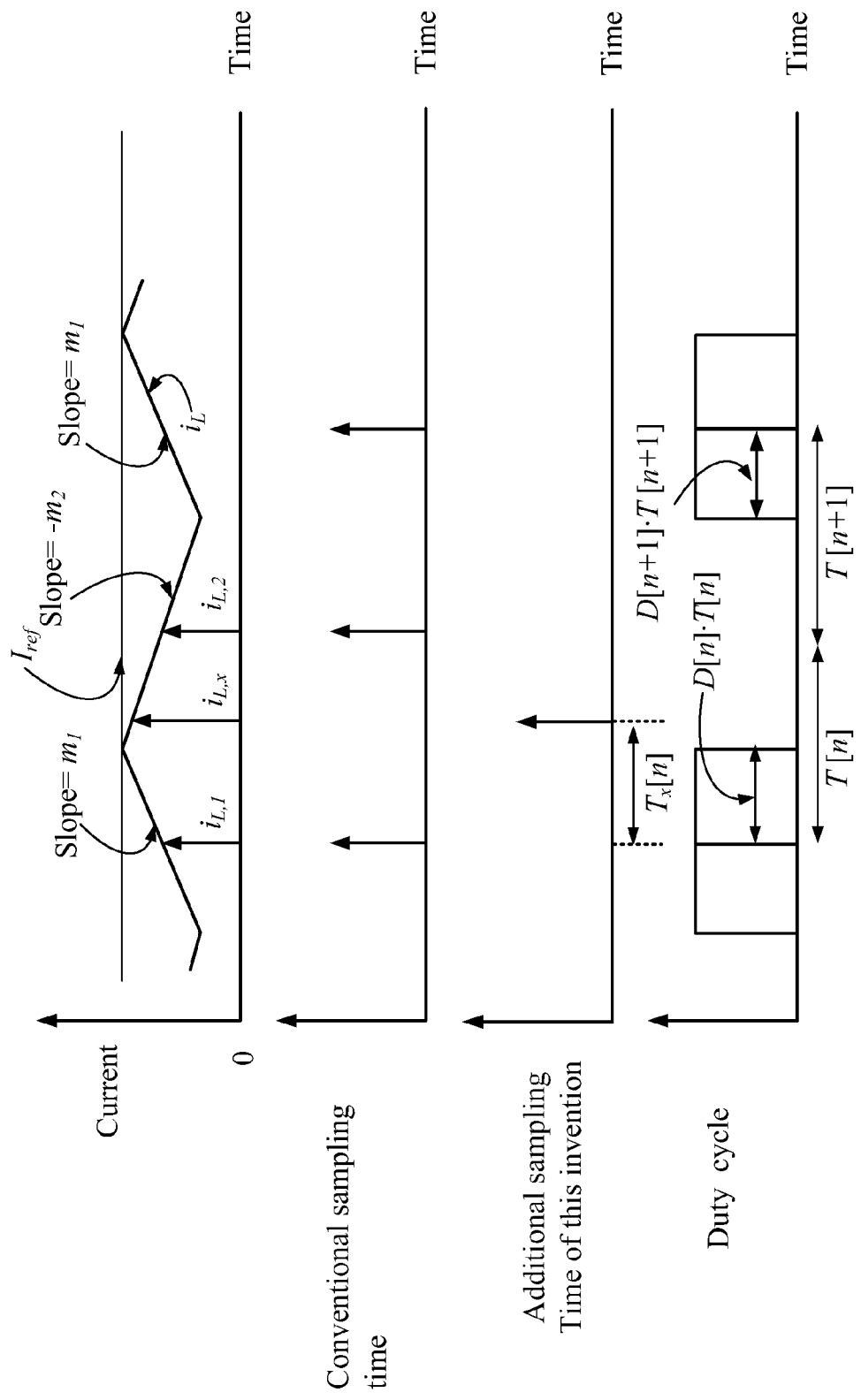
FIG. 8 shows the single switching period dual sampling modulation 2 oscillogram of this invention of driving control device and method for power converting system.

Please refer to FIG. 2 for the power converting system layout of driving control device and method for power converting system according to the present invention. The power converting system 1 converts DC input voltage $V_{in}$ to DC output voltage $V_o$. The power converting system 1 contains a power converting circuit 11 and a driving control device 12. The power converting circuit 11 composes of a driving unit 111, two switching devices Q1 and Q2 driven by driving unit 111 to open or close, an inductor L and a capacitor C interfaced with switching unit Q1 and Q2, and a current detector 112 to detect the inductor current $i_L$ on the inductor L. This power converting circuit 11 is a DC to DC power converting circuit but can be made into an alternating current (AC) to DC or a DC to AC power converting circuit with different coupling method and driving control.

The driving control device 12 is interfaced with the power converting circuit 11. It includes an analog/digital convertor 121 that converts the analog output voltage $V_o$ and inductor current $i_L$ into digital parameters of output voltage $V_o[n]$ and inductor current $i_L[n]$; a measuring unit 122 interfaced with analog/digital convertor 121 and control module 123, which collects data of parameters of the inductor current, duty cycle of the switching units, and sampling pulse signals, uses Eq. 1, Eq. 2 (described below), and the data it collects to calculate the slope parameter of the inductor current; and a control module 123 which has a controller 1231 to receive the reference voltage $V_{ref}$ and feedback the calculated reference current $I_{ref}$ as pre-defined in the control module and a modulator 1232 to initiate signals calculated from the reference current $I_{ref}$ of controller 1231 output and the slopes $m_1$ and $m_2$ of inductor current calculated by measuring unit 122 to control unit 111 to send out control signals.

The modulator 1232 also determines and sends out sampling pulse signal to the analog/digital convertor 121 for it to start sampling and convert the sampled output voltage $V_o$ and inductor current $i_L$. The measuring unit 122 collects sampling pulse signal and $D[n]$ and $T[n]$ parameters of the switches from the modulator 1232 and the inductor current $i_L[n]$ parameter from the analog/digital convertor 121. The initial inductor current $i_{L,1}$, the final inductor current $i_{L,2}$, and the sampling inductor current $i_{L,x}$ are determined by the relative position of the sampling pulse signal and switching signal. With all parameters collected and calculated, Eq. 1 will be used to calculate $m_2$, the falling slope parameter of inductor current of inductor L, and Eq. 2 will be used to calculate $m_1$, the rising slope parameter of inductor current of inductor L.

As using Eq. 1 to calculate $m_2$, the falling slope parameter of inductor current, $T[n]$ means the sampling period of the pulse control signal, $T_x[n]$ means the sampling time for the inductor current to measured, $i_{L,x}$ means the inductor current at sampling time $T_x[n]$, and $i_{L,2}$ means the final inductor current for sampling period $T[n]$. Eq. 1 is defined as:

$$m_2 = \frac{i_{L,x} - i_{L,2}}{T[n] - T_x[n]} \quad \text{(Equation 1)}$$

As using Eq. 2 to calculate $m_1$, the rising slope parameter of inductor current, $T[n]$ means the sampling period of the pulse control signal, $T_x[n]$ means the sampling time for the inductor current to measured, $i_{L,x}$ means the inductor current at sampling time $T_x[n]$, and $i_{L,2}$ means the final inductor current for sampling period $T[n]$. Eq. 2 is defined as:

$$m_1 = \frac{i_{L,x} + m_2 \cdot (T_x[n] - D[n] \cdot T[n]) - i_{L,1}}{D[n] \cdot T[n]} \quad \text{(Equation 2)}$$

The modulator 1232 uses the slope parameters $m_1$ and $m_2$ of inductor current from Eq. 1 and Eq. 2 to calculate the duty cycle parameter $D[n+1]$ for the (n+1)th sampling point. This duty cycle parameter $D[n+1]$ is for the driving unit 111 to control the open or close of switching units Q1 and Q2 by pulse control signals.

Different modulator 1232 will have different modules so the control module can have six different modules for pulse control signals. The six types are trailing edge modulation, leading edge modulation, triangle modulation 1, triangle modulation 2, single switching period dual sampling modulation 1, and single switching period dual sampling modulation 2. Different equations are used to calculate the slope parameters $m_1$ and $m_2$ for inductor current as shown in Table 1 to Table 6.

Here is the process of driving control method for power converting system:

1. The analog/digital convertor measures the inductor current on the power converting circuit.
2. The measuring unit collects data of the parameters of the inductor current and calculates the slope parameters of the inductor current for the inductor using Eq. 1 and Eq. 2.
3. The control module uses the slope parameter to calculate a duty cycle parameter and generate a pulse control signal to perform driving control according to this duty cycle parameter.

FIG. 3 through FIG. 8 show the oscillogram of this invention of driving control device and method for power converting system with different modulations. According to the figures, sampling an extra inductor current $i_{L,x}$ along with inductor current $i_L$ at sampling period $T[n]$ can be used to calculate the rising slope parameter $m_1$ and the falling slope parameter $m_2$ of inductor current, and calculate the width of the pulse control signal $D[n] \cdot T[n]$.

The inductor current parameters that the measuring unit collects include:

1. The initial inductor current $i_{L,1}$ measures at the start of the pulse control signal sampling period $T[n]$;
2. The final inductor current $i_{L,2}$ measures at the end of the pulse control signal sampling period $T[n]$;
3. A sampling inductor current $i_{L,x}$ measures at a given time $T_x[n]$ during the pulse control signal sampling period $T[n]$;

TABLE 1

| | Equations for trailing edge modulation | |
|---|---|---|
| Sampling Time | Trailing Edge Modulation | |
| | $m_1$ | $m_2$ |
| $T_x[n] > D[n] \cdot T[n]$ | $m_1 = \frac{i_{L,x} + m_2 \cdot (T_x[n] - D[n] \cdot T[n]) - i_{L,1}}{D[n] \cdot T[n]}$ | $m_2 = \frac{i_{L,x} - i_{L,2}}{T[n] - T_x[n]}$ |
| $T_x[n] < D[n] \cdot T[n]$ | $m_1 = \frac{i_{L,x} - i_{L,1}}{T_x[n]}$ | $m_2 = \frac{i_{L,x} + m_1 \cdot (D[n] \cdot T[n] - T_x[n]) - i_{L,2}}{(1 - D[n]) \cdot T[n]}$ |

TABLE 2

Equations for leading edge modulation

| Sampling Time | Leading Edge Modulation | |
|---|---|---|
| | $m_1$ | $m_2$ |
| $T_x[n] > (1-D[n]) \cdot T[n]$ | $m_1 = \dfrac{i_{L,2} - i_{L,x}}{T[n] - T_x[n]}$ | $m_2 = \dfrac{i_{L,1} + m_1 \cdot (T_x[n] - (1 - D[n]) \cdot T[n]) - i_{L,x}}{(1 - D[n]) \cdot T[n]}$ |
| $T_x[n] < (1-D[n]) \cdot T[n]$ | $m_1 = \dfrac{i_{L,2} + m_2 \cdot ((1 - D[n]) \cdot T[n] - T_x[n]) - i_{L,x}}{D[n] \cdot T[n]}$ | $m_2 = \dfrac{i_{L,1} - i_{L,x}}{T_x[n]}$ |

TABLE 3

Equations for triangle modulation 1

| Sampling Time | Trailing Modulation 1 | |
|---|---|---|
| | $m_1$ | $m_2$ |
| $T_x[n] < \dfrac{1}{2}(1 - D[n]) \cdot T[n]$ | $m_1 = \dfrac{i_{L,2} + m_2 \cdot (1 - D[n]) \cdot T[n] - m_2 \cdot T_x[n] - i_{L,x}}{D[n] \cdot T[n]}$ | $m_2 = \dfrac{i_{L,1} - i_{L,x}}{T_x[n]}$ |
| $T_x[n] > \dfrac{1}{2}(1 + D[n]) \cdot T[n]$ | $m_1 = \dfrac{i_{L,x} - m_2 \cdot D[n] \cdot T[n] + m_2 \cdot T_x[n] - i_{L,1}}{D[n] \cdot T[n]}$ | $m_2 = \dfrac{i_{L,x} - i_{L,2}}{T[n] - T_x[n]}$ |

TABLE 4

Equations for triangle modulation 2

| Sampling Time | Trailing Modulation 2 | |
|---|---|---|
| | $m_1$ | $m_2$ |
| $T_x[n] < \dfrac{1}{2} D[n] \cdot T[n]$ | $m_1 = \dfrac{i_{L,x} - i_{L,1}}{T_x[n]}$ | $m_2 = \dfrac{i_{L,x} + m_1 \cdot D[n] \cdot T[n] - m_1 \cdot T_x[n] - i_{L,2}}{(1 - D[n]) \cdot T[n]}$ |
| $T_x[n] > T[n] - \dfrac{1}{2} D[n] \cdot T[n]$ | $m_1 = \dfrac{i_{L,2} - i_{L,x}}{T[n] - T_x[n]}$ | $m_2 = \dfrac{i_{L,1} + m_1 \cdot (D[n] - 1) \cdot T[n] + m_1 \cdot T_x[n] - i_{L,x}}{(1 - D[n]) \cdot T[n]}$ |

TABLE 5

Equations for single switching period dual sampling modulation 1

| Sampling Time | Single switching period dual sampling Modulation 1 | |
|---|---|---|
| | $m_1$ | $m_2$ |
| $T_x[n] > (1-D[n]) \cdot T[n]$ | $m_1 = \dfrac{i_{L,2} - i_{L,x}}{T[n] - T_x[n]}$ | $m_2 = \dfrac{i_{L,1} + m_1 \cdot (T_x[n] - (1 - D[n]) \cdot T[n]) - i_{L,x}}{(1 - D[n]) \cdot T[n]}$ |
| $T_x[n] < (1-D[n]) \cdot T[n]$ | $m_1 = \dfrac{i_{L,2} + m_2 \cdot ((1 - D[n]) \cdot T[n] - T_x[n]) - i_{L,x}}{D[n] \cdot T[n]}$ | $m_2 = \dfrac{i_{L,1} - i_{L,x}}{T_x[n]}$ |

TABLE 6

Equations for single switching period dual sampling modulation 2

Single switching period dual sampling Modulation 2

| Sampling Time | $m_1$ | $m_2$ |
|---|---|---|
| $T_x[n] > D[n] \cdot T[n]$ | $m_1 = \dfrac{i_{L,x} + m_2 \cdot (T_x[n] - D[n] \cdot T[n]) - i_{L,1}}{D[n] \cdot T[n]}$ | $m_2 = \dfrac{i_{L,x} - i_{L,2}}{T[n] - T_x[n]}$ |
| $T_x[n] < D[n] \cdot T[n]$ | $m_1 = \dfrac{i_{L,x} - i_{L,1}}{T_x[n]}$ | $m_2 = \dfrac{i_{L,x} + m_1 \cdot (D[n] \cdot T[n] - T_x[n]) - i_{L,2}}{(1 - D[n]) \cdot T[n]}$ |

This invention of automatically calculating the slope parameter for inductor current for driving control device and method for power converting system has the following benefits over the current technologies:

1. This invention of driving control device and method for power converting system can detect and calculate the slope parameters $m_1$ and $m_2$ of inductor current on its own and help accomplishing high-accuracy digital control in power converting system with low sampling frequency.
2. This invention of driving control device and method for power converting system can be used in different modulations for high-accuracy digital control.
3. This invention of automatically calculating the slope parameter for inductor current for driving control device and method for power converting system whose power converting circuit can be a DC to DC, AC to DC, or DC to AC power converting circuit.

The aforementioned descriptions are solely for explaining the embodiments of the present invention and are not intended to limit the scope of the present invention. Any equivalent practice of modification within the spirit of the present invention should be treated as being within the scope of patent of the present invention.

As aforementioned, the present invention is novel in technology and advantaged in many effects that the prior arts lack. The present invention conforms to the novelty and non-obviousness of patentability. Please the examiner carefully considering the application of the present invention and allowing the application.

What is claimed is:

1. A driving control device for power converting system interfaced with a power converting circuit, comprising
    an analog/digital convertor which converts analog output voltage and inductor current of an inductor into digital output voltage and inductor current parameters;
    a measuring unit, interfaced with the analog/digital convertor, to collect data of inductor current parameters, duty cycle of switching units, sampling pulse signal and calculate slope parameters of the inductor current of the inductor; and
    a control module, interfaced with a driving unit, the measuring unit and the analog/digital convertor, containing a controller and a modulator, to calculate the duty cycle parameter from the slope parameters of the inductor current and generate a pulse control signal to operate open or close of the switching units through the driving unit.

2. The driving control device for power converting system as claimed in claim 1, wherein the power converting circuit includes the driving unit, two switching units operated by the driving unit, the inductor coupled with one switching unit, a capacitor coupled with the other switching unit, and a current detector to detect inductor current on the inductor.

3. The driving control device for power converting system as claimed in claim 1, wherein the power converting circuit can be a DC to DC, AC to DC, or DC to AC power converting circuit.

4. The driving control device for power converting system as claimed in claim 1, wherein the control module can use trailing edge modulation, leading edge modulation, triangle modulation, or single switching period dual sampling modulation to generate the pulse control signal.

5. A driving control method for a power converting system whose steps comprise:
    1) detecting inductor current of a power converting circuit by an analog/digital convertor;
    2) collecting inductor current parameters and uses Equations with the parameters by a measuring unit to calculate slope parameters for the inductor current of an inductor;
    3) using the slope parameters of the inductor current to calculate a duty cycle parameter by a control module and using it to generate a pulse control signal to perform driving control.

6. The driving control method for power converting system as claimed in claim 5, wherein the measuring unit collects parameters of the inductor current including:
    1) initial inductor current $i_{L,1}$ measuring at start of the pulse control signal sampling period $T[n]$;
    2) final inductor current $i_{L,2}$ measuring at end of the pulse control signal sampling period $T[n]$;
    3) sampling inductor current $i_{L,x}$ measuring at a given time $T_x[n]$ during the pulse control signal sampling period $T[n]$.

7. The driving control method for power converting system as claimed in claim 6, wherein the Equations include Equation 1 and Equation 2 defined as:

$$m_2 = \frac{i_{L,x} - i_{L,2}}{T[n] - T_x[n]} \qquad \text{(Equation 1)}$$

$$m_1 = \frac{i_{L,x} + m_2 \cdot (T_x[n] - D[n] \cdot T[n]) - i_{L,1}}{D[n] \cdot T[n]} \qquad \text{(Equation 2)}$$

wherein $T[n]$ means the sampling period of the pulse control signal, $T_x[n]$ means the sampling time for the inductor current to measured, $i_{L,x}$ means the inductor current at sampling time $T_x[n]$, and $i_{L,2}$ means the final inductor current for sampling period $T[n]$.

8. The driving control method for power converting system as claimed in claim 7, wherein the Equation 1 and Equation 2 for calculating the slope parameters for the inductor current will be different according to modulation types.

9. The driving control method for power converting system as claimed in claim 8, wherein the modulation type can be trailing edge modulation, leading edge modulation, triangle modulation, or single switching period dual sampling modulation.

* * * * *